(12) United States Patent
Perry et al.

(10) Patent No.: US 11,283,538 B2
(45) Date of Patent: Mar. 22, 2022

(54) SINGLE FIBER COMBINING MODULE

(71) Applicant: AT&T Intellectual Property I, L.P., Atlanta, GA (US)

(72) Inventors: Ricky Perry, Cumming, GA (US); Abdellah Tazi, Redmond, WA (US); Kent McCammon, Livermore, CA (US); Edward Walter, Boerne, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/809,906

(22) Filed: Mar. 5, 2020

(65) Prior Publication Data
US 2021/0281347 A1 Sep. 9, 2021

(51) Int. Cl.
*H04J 14/00* (2006.01)
*H04J 14/02* (2006.01)

(52) U.S. Cl.
CPC .................................. *H04J 14/023* (2013.01)

(58) Field of Classification Search
CPC ...................................................... H04J 14/023
See application file for complete search history.

(56) References Cited

U.S. PATENT DOCUMENTS

| | | | |
|---|---|---|---|
| 8,238,751 B1 | 8/2012 | Iannone et al. | |
| 2011/0158650 A1* | 6/2011 | Cavaliere | H04J 14/0227 398/79 |
| 2012/0039605 A1* | 2/2012 | Zhu | H04J 14/0226 398/58 |
| 2017/0134113 A1* | 5/2017 | Lam | H04J 14/08 |
| 2017/0150243 A1* | 5/2017 | Du | H04L 69/18 |
| 2017/0212321 A1* | 7/2017 | Gronvall | G02B 6/4475 |
| 2018/0076890 A1* | 3/2018 | Ruchet | H04J 14/0221 |
| 2019/0037286 A1* | 1/2019 | Ghuman | H04J 14/0291 |
| 2020/0244387 A1* | 7/2020 | Ghuman | H04J 14/0221 |
| 2020/0245045 A1* | 7/2020 | Ghuman | H04B 10/032 |

OTHER PUBLICATIONS

Tarluz, "Spcification Differences Among GPON, XG-PON and XGS-PON", Jul. 1, 2019, All pages.*
Tarluz, "Spcification Differences Among GPON, XG-PON and XGS-PON", Jul. 1, 2019, All pages (Year: 2019).*
Tarluz, "Specification Differences Among GPON, XG-PON and XGS-PON", "http://www.tarluz.com/ftth/specification-differences-among-gpon-xg-pon-and-xgs-pon/", Jul. 1, 2019, All pages (Year: 2019).*

* cited by examiner

*Primary Examiner* — David C Payne
*Assistant Examiner* — Pranesh K Barua
(74) *Attorney, Agent, or Firm* — Guntin & Gust, PLC; Atanu Das (57) ABSTRACT

A system may use a single fiber combining module (SFCM) that combines multiple wavelength channels of different optical technologies over a single fiber. In an example, a SFCM may include a gigabit passive optical network (GPON) port, wherein the GPON passes signals at a first wavelength range; a XGS PON port, wherein the XGS-PON port passes signals at a second wavelength range; a dense wavelength division multiplexing (DWDM) port, wherein the DWDM port passes signals at a third wavelength range, wherein the first frequency range, the second frequency range, and the third wavelength range are different; and a common port connected with a fiber, the common port simultaneously combining signals from the GPON port, XGS-PON port, and the DWDM port.

12 Claims, 5 Drawing Sheets

SINGLE FIBER COMBINING MODULE

BACKGROUND

Fiber optics, or optical fiber, refers to the medium and the technology associated with the transmission of information as light pulses along a glass or plastic strand of fiber. Fiber optics may be used for long-distance and high-performance data networking.

This background information is provided to reveal information believed by the applicant to be of possible relevance. No admission is necessarily intended, nor should be construed, that any of the preceding information constitutes prior art.

SUMMARY

Disclosed herein is a system that may use a single fiber combining module (SFCM) that combines multiple wavelength channels of different optical technologies over a single fiber. In an example, a SFCM may include a gigabit passive optical network (GPON) port, wherein the GPON passes signals at a first wavelength range; a XGS PON port, wherein the XGS-PON port passes signals at a second wavelength range; a dense wavelength division multiplexing (DWDM) port, wherein the DWDM port passes signals at a third wavelength range, wherein the first frequency range, the second frequency range, and the third wavelength range are different; and a common port connected with a fiber, the common port simultaneously combining signals from the GPON port, XGS PON port, and the DWDM port.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

A passive optical network (PON) is a fiber-optic telecommunications technology that may deliver broadband network access to end-subscribers. PON architecture may be implemented to use a point-to-multipoint topology, in which a single optical fiber serves multiple endpoints by using unpowered (passive) fiber optic splitters to divide the fiber bandwidth among multiple access points. PONs are often referred to as the last mile between an Internet service provider (ISP) and its subscribers.

Disclosed herein is a single fiber combining module (SFCM) that combines multiple wavelength channels of different optical technologies over a single fiber, such as a working passive optical network (PON) line.

Figure 1:
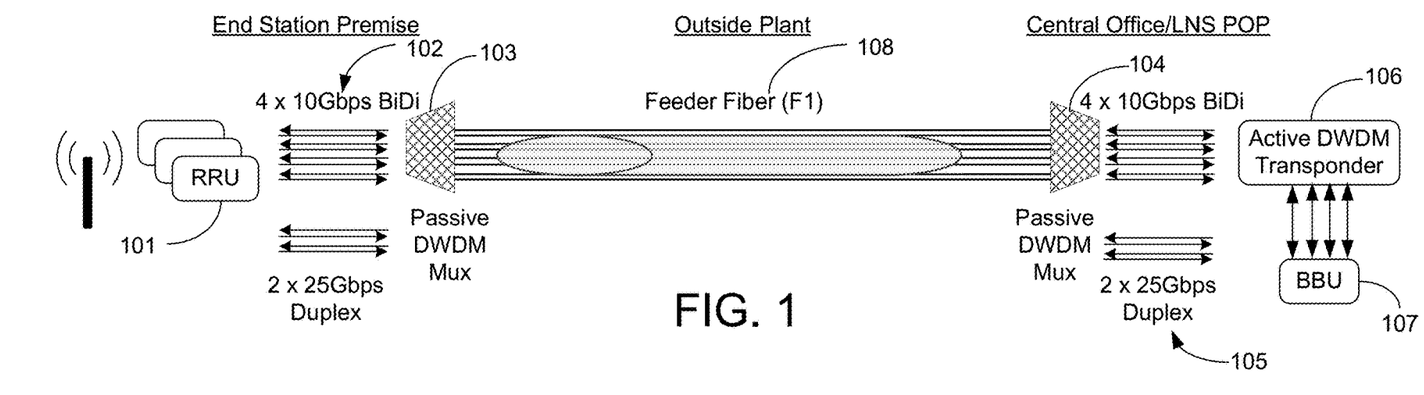
FIG. 1 illustrates an exemplary implementation of dense wavelength division multiplexing (DWDM), such a mobile cell site.
Figure 2:
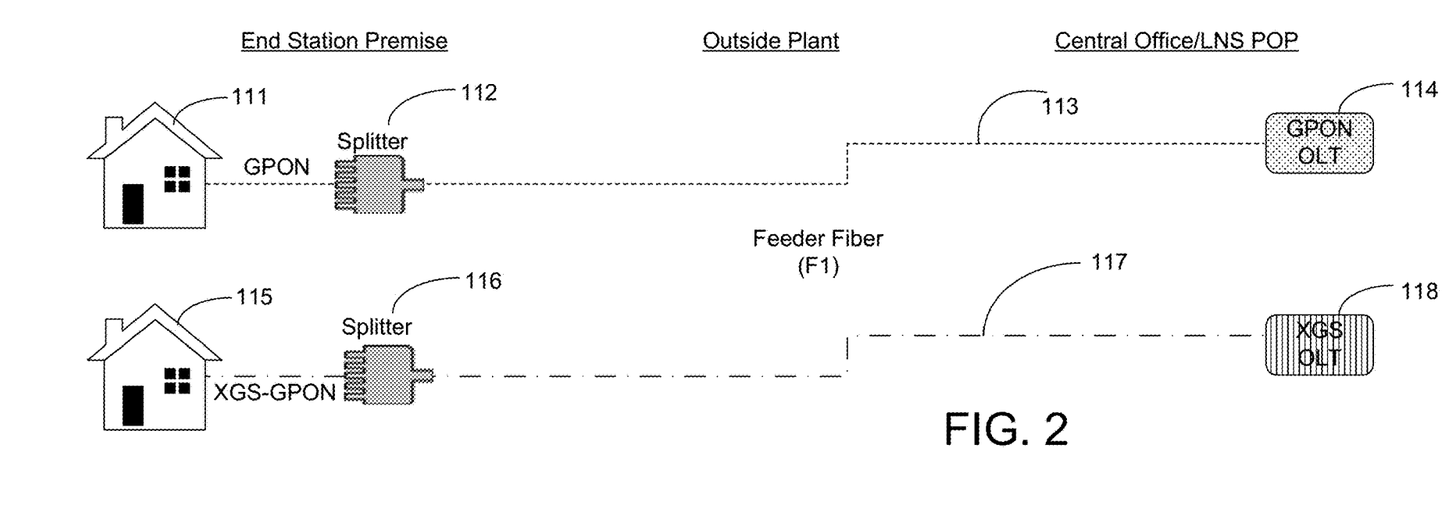
FIG. 2 illustrates exemplary implementations of passive optical networks.

FIG. 1 illustrates an exemplary implementation of dense wavelength division multiplexing (DWDM). In this conventional implementation, there may be multiple remote radio units (RRUs) 101, which may be located on or near one or more end station (e.g., wireless node) premises. RRUs 101 may be connected via a plurality of links 102 with passive DWDM mux 103. The plurality of links 102 may be bi-directional links or duplex links. Passive DWDM mux 103, which may be near an end station premise, may be connected via a single fiber 108 with passive DWDM mux 104. Passive DWDM mux 104 may be within a central office (e.g., point of presence) and connected with (via links 105) active DWDM transponder 106. Active DWDM transponder 106 may be connected with base band unit 107. FIG. 2 illustrates exemplary implementations of passive optical networks. As shown, there may be a Gigabit-PON (G-PON) implementation and XGS-PON implementation. In the GPON implementation, a location 111 may be connected with splitter 112 on or near a end station premise. Splitter 112 may be connected via a single fiber 113 to GPON optical line termination (OLT) 114, in which GPON OLT 114 may be located within central office. In the XGS-PON implementation, a location 115 may be connected with splitter 116 on or near a end station premise. Splitter 116 may be connected via a single fiber 117 to XGS-PON optical line termination (OLT) 114, in which XGS OLT 114 may be located within a central office.

Figure 3A:
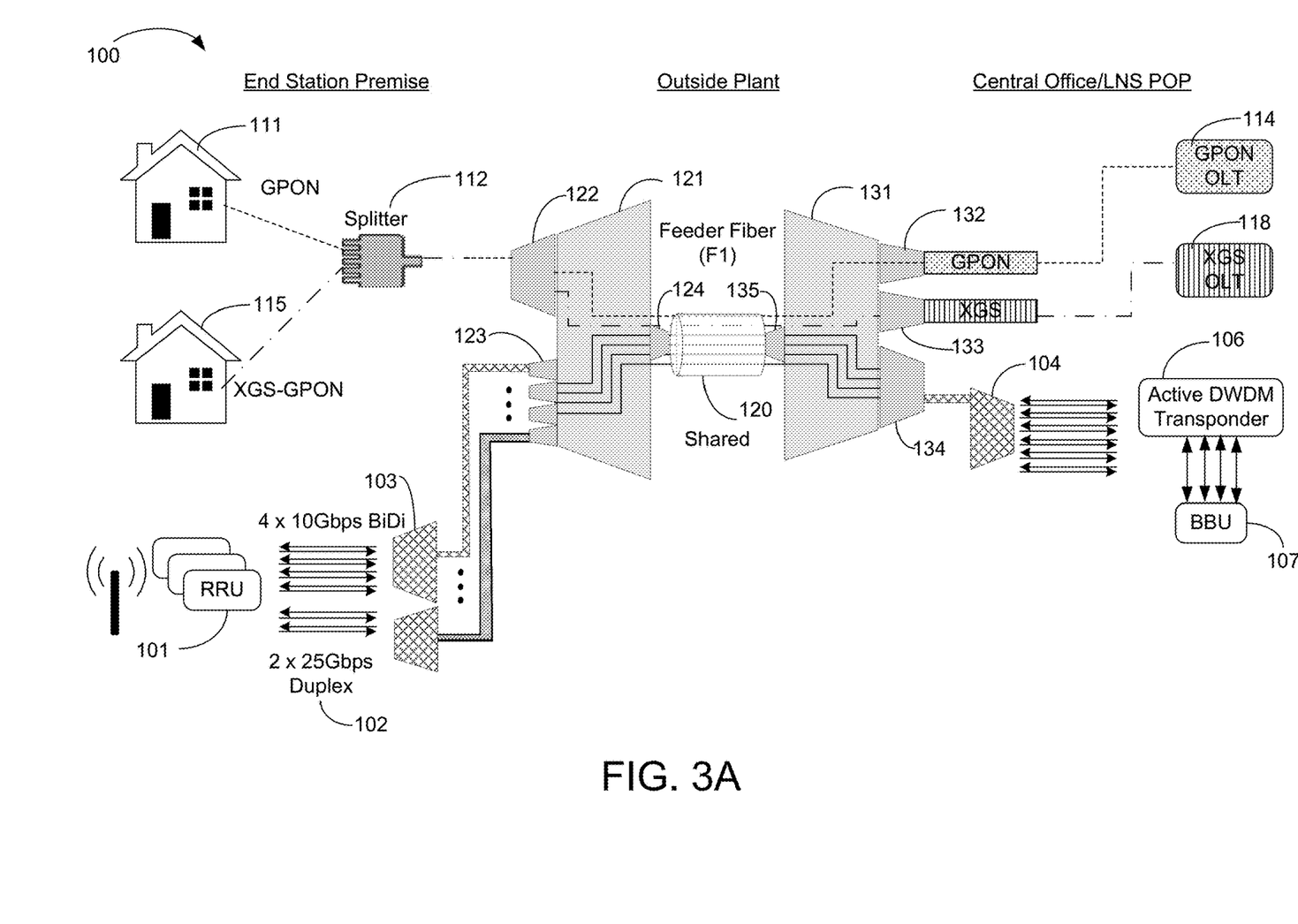
FIG. 3A illustrates an exemplary implementation of a system with a single fiber combining module (SFCM).

FIG. 3A illustrates an exemplary implementation of system 100 with a single fiber combining module (SFCM), which is disclosed in more detail herein. Single fiber combining module 121 may be a 3-port module located on or near the end station premise. Port 122 of SFCM 121 may be connected with splitter 112. As shown, location 111 associated with GPON and location 115 associated with XGS-PON may be routed to single splitter 112. This splitter configuration allows for XGS-PON and GPON to be connected through a single splitter for multiple locations. Port 123 of SFCM 121 may be connected with passive DWDM 103. There may be multiple port 123 connected to respective DWDMs. See also FIG. 5. As provided in more detail herein, XGS-PON, GPON, and DWDM, may be sent to a single port 124 and corresponding single fiber 120 in order to connect with SFCM 131, in which SFCM 131 may be located within the central office. Again, XGS-PON, GPON, and DWDM may share a single fiber, which may reduce cost and resources, as well as increase the utilization of previously unused or underutilized fiber.

Figure 3B:
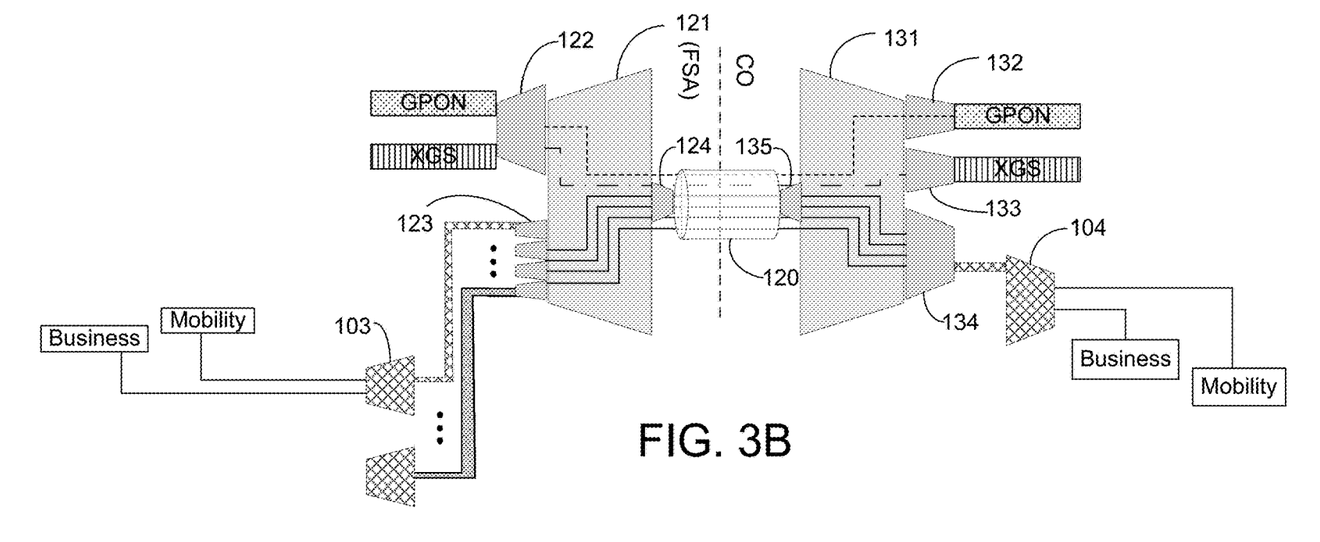
FIG. 3B illustrates an exemplary implementation of a system with the SFCMs.

With continued reference to FIG. 3A, SFCM 131 may be a 4-port module. Port 132 may be connected with GPON OLT 114, port 133 may be connected with XGS OLT 118, port 134 may be connected with passive DWDM mux 104, and port 135 may be connected to single fiber 120. FIG. 3B illustrates a portion of the exemplary implementation of system 100 with the single fiber combining modules (SFCMs). System 100 allows for the combination of PONs of different types and DWDM (e.g., point-to-point (PtP) DWDM) onto a single fiber. System 100 allows for leveraging PtP DWDM as a multiservice solution without PON encapsulation. SFCM 121 and splitter 112 may be placed on new mobility construction for future business or consumer additions.

Figure 4:
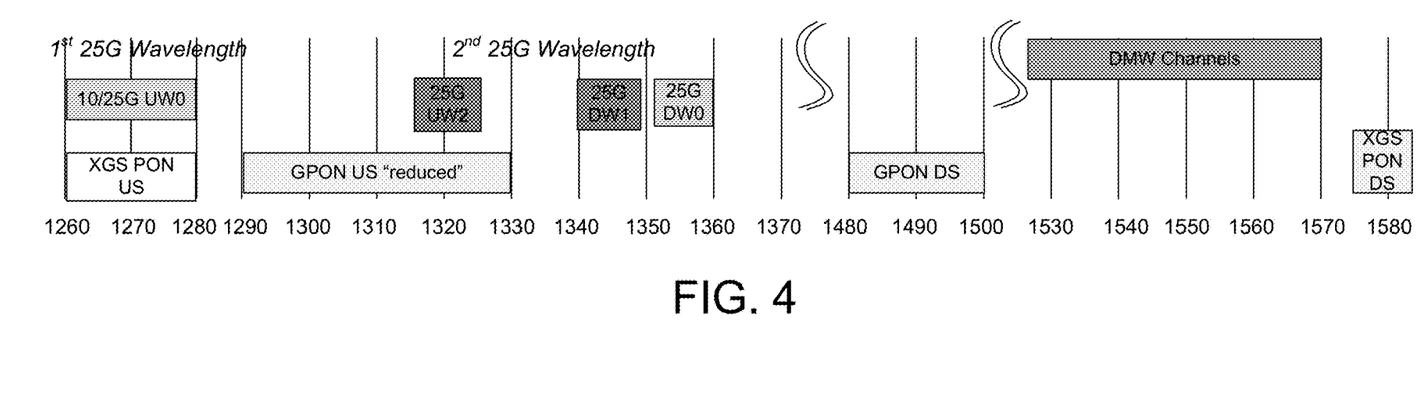
FIG. 4 illustrates an exemplary graph of optical transmission wavelengths that may be used for the system with the SFCMs.
Figure 5:
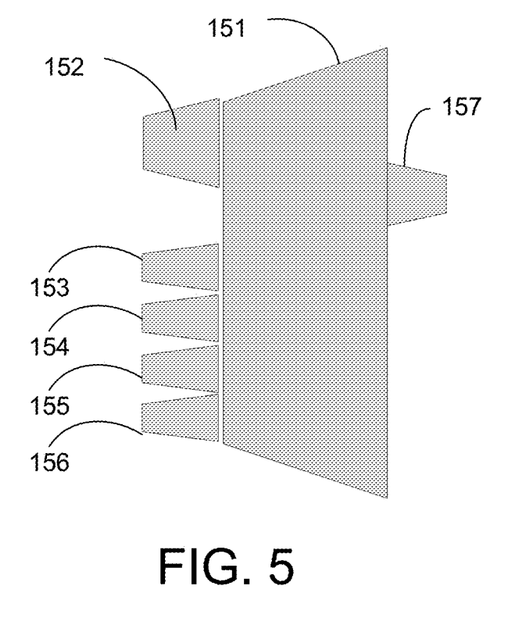
FIG. 5 illustrates an exemplary 6-port SFCM.

FIG. 4 illustrates an exemplary graph of optical transmission wavelengths that may be used for system 100. Multiple SFCM configurations are contemplated herein and Table 1 provides exemplary configurations. Table 2 provides an exemplary configuration of SCFM 131 that includes optical transmission wavelengths for each port and corresponding optical technologies. Table 3 provides an exemplary configuration of SCFM 151 as shown in FIG. 5 (see also SCFM 121 in FIG. 3A-FIG. 3B) that includes optical transmission wavelengths for each port and corresponding optical technologies. As shown in FIG. 5, port 150 may be a com port, port 152 may support XGS-PON, and port 153-port 156 (which may include group A through group D) may support DWDM. Each port 153-port 156 may support 8 channels (e.g., 4×8 channels).

TABLE 1

| GPON, XGS-PON, and DWDM |
|---|
| XGS-PON, 25G-PON, and DWDM |
| GPON, 25G-PON, and DWDM |
| XGS-PON, 50G-PON, and DWDM |

TABLE 2

SCFM (4-Port)

| Port | Port Labeling | Pass Group (nm) |
|---|---|---|
| 135 | Common | 1260-1581 |
| 132 | GPON or 25-50G-PON | 1480-1500 |
|  |  | 1290-1330 |
| 133 | XGS-PON | 1575-1581 |
|  |  | 1260-1280 |
| 134 | DWDM (Group A-D) | 1529.55-1560.61 |

TABLE 3

SCFM (6-Port)

| Port | Port Labeling | Pass Group (nm) |
|---|---|---|
| 157 | Common | 1260-1581 |
| 152 | XGS/GPON/25-50G-PON | 1260-1360, 1480-1500, 1575-1581 |
| 153 | Group D | 1529.55-1535.04 |
| 154 | Group C | 1536.61-1542.14 |
| 155 | Group B | 1547.72-1553.33 |
| 156 | Group A | 1554.94-1560.61 |

The disclosed SCFM allows different optical technologies to be combined on a single strand of fiber. The spectrum may be fragmented to the ranges herein (e.g., in FIG. 4, Table 2, or Table 3) in order to share the single fiber amongst the different technologies in a manner that keeps insertion loss low, so performance may be maintained. Conventionally, as shown in FIG. 1 and FIG. 2, these optical technologies would be on their own dedicated fiber; for example, GPON, XGS PON, and DWDM would be tied to a dedicated fiber. The SFCM architecture allows these optical technologies to interoperate on the same single fiber. Therefore, the use of SFCMs may allow for significant fiber savings.

Low loss is a consideration with regard to the SCFM. In a first option, frequencies may be arranged to allow for a larger guard band and therefore simpler filter design, which may significantly reduce cost. For example, as shown in Table 2 and SFCM 131, there may be a 1529.55-1560.61 nm bandpass. This bandpass may support 32 channels with tunable bidirectionality. The arrangement associated with the first option allows for low insertion loss (e.g., <loss of 1.1 dbm) which may provide minimal impact on PON technology performance. In an example second option, there may be support of a 1524-1570 nm band. With this second option, there may be a short (e.g., <5 nm) guard band with XGS-PON signal, therefore a sharper filter implementation may be needed which may lead to a higher cost implementation than the first option.

Single Fiber Combining Module may be an electrically passive (e.g., non-powered) WDM device used to combine signals of different optical technologies. For example, SFCM may use 4 separate ports including a port for GPON, a port for XGS-PON, a DWDM Band port, and a common port with GPON signals, XGS-PON signals, and DWDM signals combined and connected through the fiber to the outside plant. The DWDM port may carry 32 DWDM grid channels at 100 GHz spacing for additional circuits on a connected and working fiber (e.g., an already utilized PON fiber).

In fiber routes without spare fibers (e.g., blocked routes or held orders), a system with SCFM may be faster than conventional methods or systems to build new services, which may not have the luxury of fiber cable jobs in the feeder section and may have the need to save the time that would be used splice connectivity along an entire fiber route. In an example implementation, the DWDM range extending from 1520 to 1570 nm may be reduced to allow guard bands between DWDM Bandpass and the downstream (DS) GPON and the downstream (DS) XGPON signals coexisting on the common port and fiber down the fiber route and providing higher isolation at lower SFCM device cost.

Figure 6:
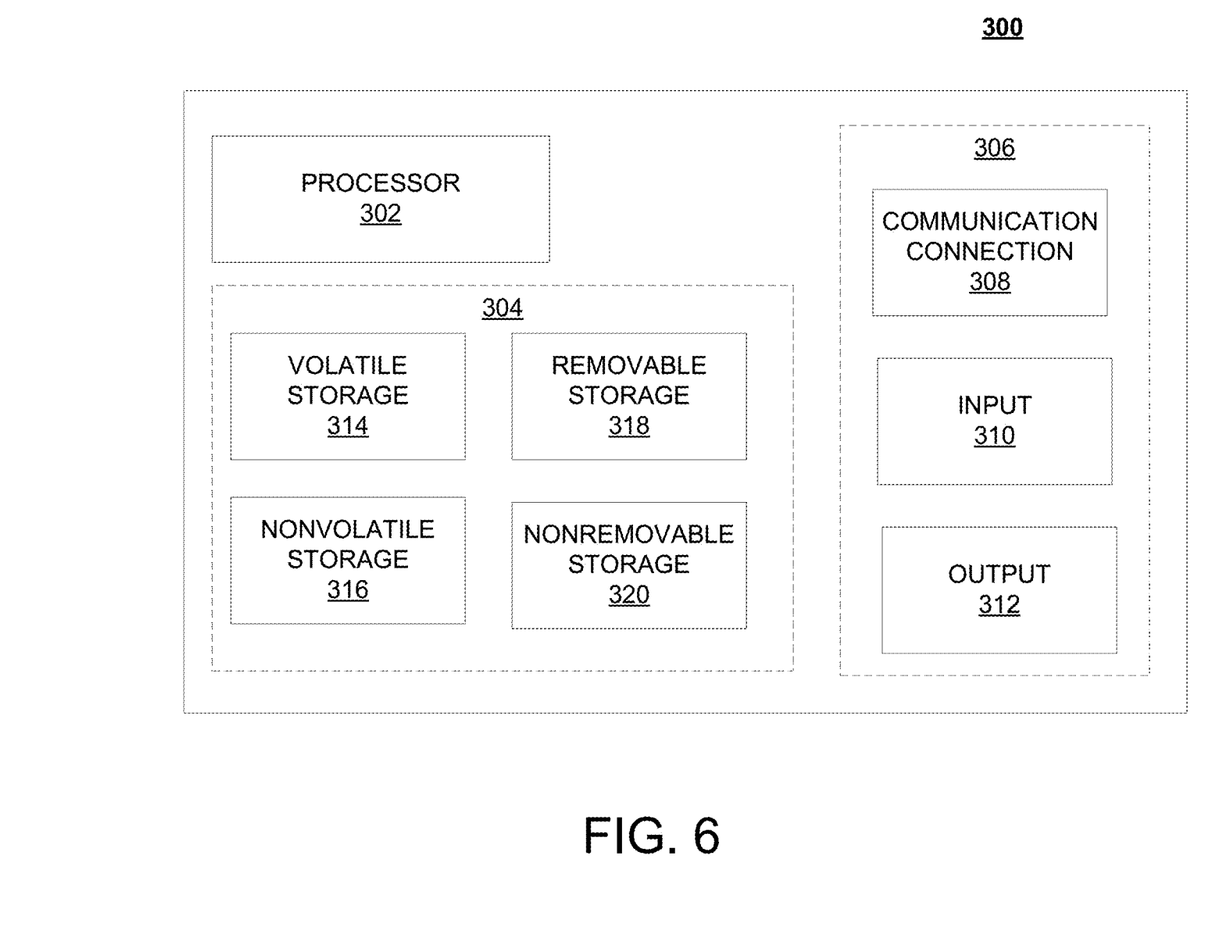
FIG. 6 illustrates a schematic of an exemplary network device.

FIG. 6 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, reconfigurable optical add-drop multiplexer (ROADM), base band unit (BBU), remote radio unit (RRU), multiplexer, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

While examples of a system in which SFCM can be used have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

In describing preferred methods, systems, or apparatuses of the subject matter of the present disclosure—the SFCM—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for combining multiple optical technologies. In an example, an apparatus may include a GPON port, wherein the GPON passes signals at a first wavelength range; a XGS PON port, wherein the XGS PON port passes signals at a second wavelength range; a DWDM port, wherein the DWDM port passes signals at a third wavelength range, wherein the first frequency range, the second frequency range, and the third wavelength range are different; and a common port connected with a fiber, the common port simultaneously combining signals from the GPON port, XGS PON port, and the DWDM port. The first wavelength ranges may include 1480 nm-1500 nm (e.g., GPON downstream—From the central office to end station) and 1290-1360 (e.g., GPON upstream from end station to central office; 25 Gig PON upstream and downstream). The second wavelength ranges may include 1575-1581 nm (e.g., XGS-PON downstream), and 1260-1280 (e.g., XGS-PON upstream). See FIG. 4. The third wavelength range may include 1529.55-1560.61 nm (bi-directional). The common port may pass signals at a fourth wavelength range of 1260-1581 nm. A system of FIG. 3A or FIG. 3B. A system comprising a first SFCM connected to a first plurality of optical technologies; a second SFCM connected to a second plurality of optical technologies, wherein the first SFCM and the second SFCM are communicatively connected using one or more fibers and combines the first plurality of optical technologies and the second plurality of optical technologies on the one or more fibers. An apparatus, the apparatus comprising: a first port, wherein the first port is for a passive optical network (PON) technology that passes signals at a first wavelength range or a second wavelength range; one or more ports, wherein the one or more ports are for dense wavelength division multiplexing (DWDM) technology that passes signals at a third wavelength range, wherein the first wavelength range, the second wavelength range, and the third wavelength range are different; and a common port connected with a fiber, the common port obtaining or transmitting combined signals from the first port and the one or more ports. It is contemplated herein that the Mux may be active, which may give some functionality to route wavelengths between multiple fiber paths. The tunable optics gives flexibility already that may be similar to using an ADM. All combinations in this paragraph (including the removal or addition of steps) are contemplated in a manner that is consistent with the other portions of the detailed description.

What is claimed is:

1. A system comprising:
a first apparatus receiving signals from a central office premise into a first port, a second port, and a third port of the first apparatus, wherein the first apparatus is a first filter module, the first apparatus comprising:
the first port of the first apparatus, wherein the first port is for gigabit passive optical network (PON) technology that passes, via a first filter, signals at a first wavelength range;
the second port of the first apparatus, wherein the second port is for XGS-PON technology that passes, via a second filter, signals at a second wavelength range;
the third port of the first apparatus, wherein the third port is for dense wavelength division multiplexing (DWDM) technology that passes, via a third filter, signals at a DWDM wavelength range; and
a common port of the first apparatus connected with a fiber, the common port obtaining or transmitting combined signals from the first port, the second port, and the third port, the common port of the first apparatus communicatively connected with a common port of a second apparatus; and
the second apparatus sending the signals towards multiple end station premises via a first port, a second port, a third port, a fourth port, and a fifth port of the second apparatus, wherein the second apparatus is a second filter module, the second apparatus comprising:
the first port of the second apparatus, wherein the first port of the second apparatus is connected with a splitter, wherein the first port receives from the splitter communications associated with gigabit passive optical network (PON) technology that passes, via a fourth filter, the signals at the first wavelength range and a XGS-PON technology that passes the signals at the second wavelength range;
the second port of the second apparatus, wherein the second port of the second apparatus is for DWDM technology that passes, via a fifth filter, signals at a third wavelength range;
the third port of the second apparatus, wherein the third port of the second apparatus is for DWDM technology that passes, via a sixth filter, signals at a fourth wavelength range;
the fourth port of the second apparatus, wherein the fourth port of the second apparatus is for DWDM technology that passes, via a seventh filter, signals at a fifth wavelength range;
the fifth port of the second apparatus, wherein the fifth port of the second apparatus is for DWDM technology that passes, via an eighth filter, signals at a sixth wavelength range, wherein the first wavelength range, the second wavelength range, the third wavelength range, the fourth wavelength range, the fifth wavelength range, and the sixth wavelength range are different; and
the common port of the second apparatus connected with the fiber, the common port obtaining or transmitting combined signals from the first port of the second apparatus, the second port of the second apparatus, the third port of the second apparatus, the fourth port of the second apparatus, and the fifth port of the second apparatus,
wherein the first port of the second apparatus, the second port of the second apparatus, the third port of the second apparatus, the fourth port of the second apparatus, and the fifth port of the second apparatus, are physically different.

2. The apparatus of claim 1, wherein the first wavelength range is restricted to 1480 nm-1500 nm.

3. The apparatus of claim 1, wherein the first wavelength range is restricted to 1290 nm-1360 nm.

4. The apparatus of claim 1, wherein the first wavelength range is restricted to 1480 nm-1500 nm and 1290 nm-1360 nm.

5. The apparatus of claim 1, wherein the second wavelength range is restricted to 1575 nm-1581 nm.

6. The apparatus of claim 1, wherein the second wavelength range is restricted to 1260 nm-1280 nm.

7. The apparatus of claim 1, wherein the second wavelength range is restricted to 1575-1581 nm and 1260 nm-1280 nm.

8. The apparatus of claim 1, wherein the third wavelength range comprises channels.

9. The apparatus of claim 1, wherein the third wavelength range is restricted to 1524 nm-1570 nm.

10. The apparatus of claim 1, wherein the common port passes signals at a common port wavelength range restricted to 1260-1581 nm.

11. An apparatus, the apparatus sending signals towards multiple end station premises via a first port, a second port, a third port, a fourth port, and a fifth port of the apparatus, wherein the apparatus is an electrically passive filter module, the apparatus comprising:
   a first port, wherein the first port is connected with a splitter, wherein the first port receives from the splitter communications associated with gigabit passive optical network (GPON) technology and a XGS-PON technology, wherein the first port passes, via a first filter, signals at an initial wavelength range, a first wavelength range, and a second wavelength range;
   a second port, wherein the second port is for DWDM technology that passes, via a second filter, signals at a third wavelength range;
   a third port, wherein the third port is for DWDM technology that passes, via a third filter, signals at a fourth wavelength range;
   a fourth port, wherein the fourth port is for DWDM technology that passes, via a fourth filter, signals at a fifth wavelength range;
   a fifth port, wherein the fifth port is for DWDM technology that passes, via a fifth filter, signals at a sixth wavelength range, wherein the initial wavelength range restricted to 1260 nm-1360 nm, the first wavelength range restricted to 1480 nm-1500 nm, the second wavelength range restricted to 1575 nm-1581 nm, the third wavelength range restricted to 1529.55 nm-1535.04 nm, the fourth wavelength range restricted to 1536.61 nm-1542.14 nm, the fifth wavelength range restricted to 1547.72 nm-1542.14 nm, and the sixth wavelength range restricted to 1554.94 nm-1560.61 nm; and
   a common port connected with a fiber, the common port obtaining or transmitting combined signals from the first port, the second port, the third port, the fourth port, and the fifth port, wherein the first port, the second port, the third port, the fourth port, and the fifth port are physically different.

12. The apparatus of claim 11, wherein the first port comprises gigabit PON (GPON) technology, XGS-PON technology, 25G PON technology, or 50G PON technology.

* * * * *